United States Patent [19]

Miner

[11] 4,024,598
[45] May 24, 1977

[54] BRUSH CONTROL SYSTEM FOR VEHICLE WASH APPARATUS

[75] Inventor: Earl L. Miner, Lebanon, Mo.

[73] Assignee: Detroit Tool & Engineering Co., Lebanon, Mo.

[22] Filed: Aug. 14, 1975

[21] Appl. No.: 604,497

[52] U.S. Cl. .............................. 15/53 A; 15/DIG. 2
[51] Int. Cl.² .......................................... B60S 3/06
[58] Field of Search .......... 15/DIG. 2, 53 A, 53 AB

[56] References Cited
UNITED STATES PATENTS 3,559,225  2/1971  Gougoulas .......................... 15/53 A

FOREIGN PATENTS OR APPLICATIONS 2,006,597  12/1969  France ............................ 15/DIG. 2
2,011,926  9/1971  Germany ......................... 15/DIG. 2

*Primary Examiner*—Edward L. Roberts
*Attorney, Agent, or Firm*—Cohn, Powell & Hind

[57] ABSTRACT

This cable and pulley system is used for controlling transverse movement of side brushes mounted to a gantry-type vehicle wash and includes a compensating mechanism. The compensating mechanism includes a pair of interconnected articulated arms carrying pulley assemblies at the lower end and the arms can be swung in a transverse direction to permit one side brush to continue to move independently into engagement with the vehicle when the other brush engages the vehicle first.

10 Claims, 8 Drawing Figures

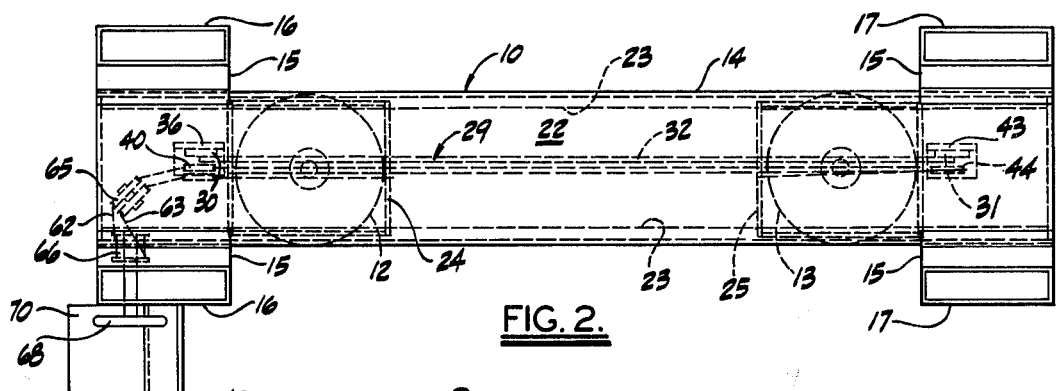

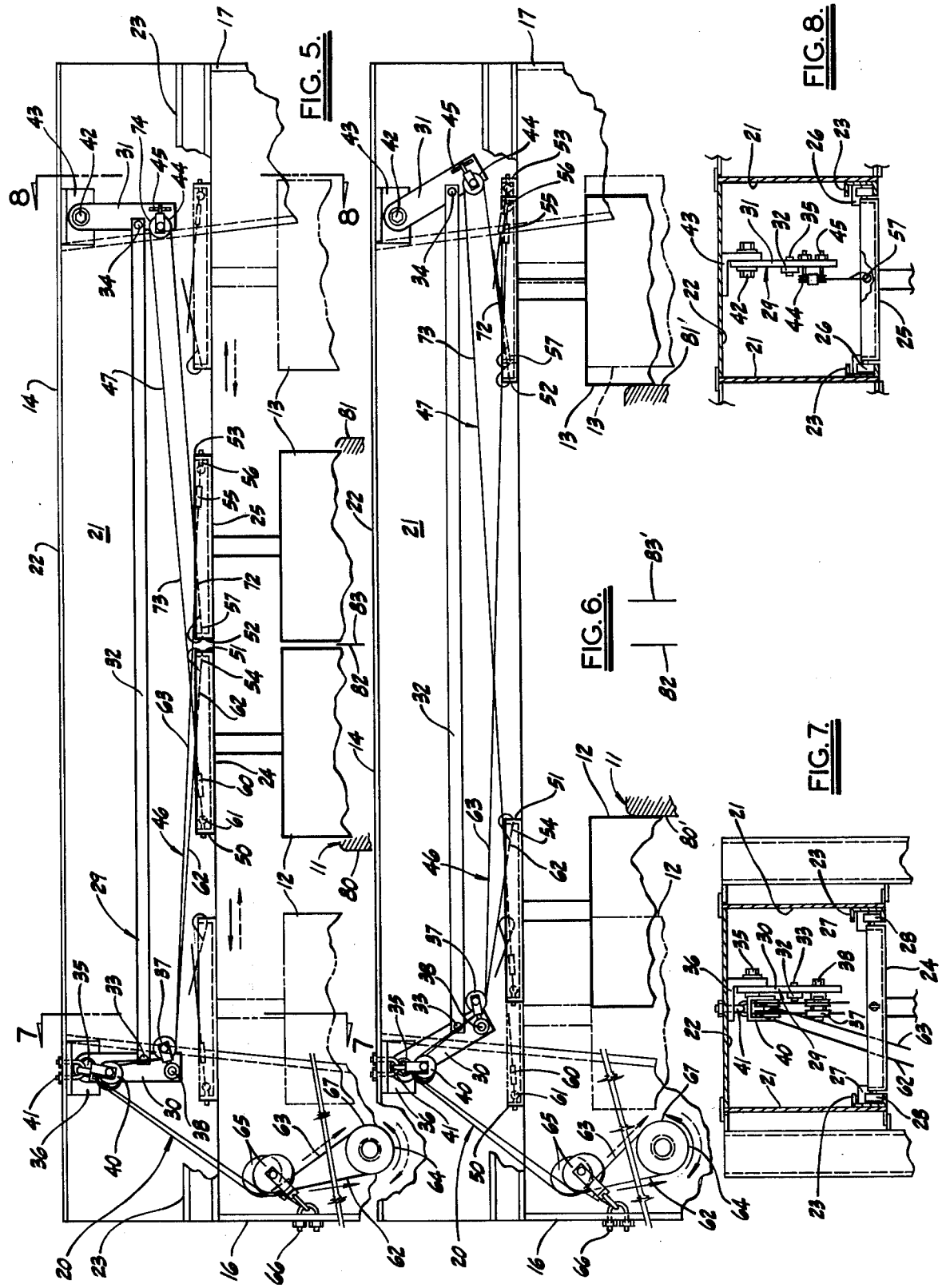

BRUSH CONTROL SYSTEM FOR VEHICLE WASH APPARATUS

BACKGROUND OF THE INVENTION

This invention relates generally to a side brush control system for a gantry vehicle wash and particularly to a control system having a compensating mechanism.

The use of two side brushes in a gantry type vehicle wash system allows the operator to double the vehicle side brush coverage for the same amount of longitudinal gantry travel. It is a relatively simple matter to provide a cable system to move the side brushes equal amounts from a fixed point such as the center of the gantry wash bay. However, unless the vehicle to be washed is accurately centered in the bay the vehicle sides are not disposed equal distances from the center of the bay and one brush will consequently engage the vehicle before the other. The result is that one side of the vehicle will not be washed, or at least the brush pressure will be uneven. The problem is further aggravated when the vehicle is parked at an angle to the center of the wash bay.

This brush control system overcomes these problems in a manner not disclosed in the known prior art.

SUMMARY OF THE INVENTION

This vehicle wash, side brush control system includes a compensating mechanism which permits the side brushes to move independently so that the vehicle sides can be washed with substantially the same brush pressure, even when the vehicle is not centered in the gantry wash bay.

The control system is provided by a cable and pulley assembly which moves the side brushes together in opposite directions until one side of such a non-centered vehicle is engaged by one of the brushes, at which time the other brush continues to move until it engages the other side of the vehicle.

It is an important object of this invention to provide a gantry having first and second carriages each carrying a depending side brush and to provide first and second cable means each having opposed ends connected to each of said carriages so that the selective application of a pull to said first cable means draws said carriages toward or away from each other.

It is a primary object of this invention to provide a compensating mechanism for the side brush control system which includes first and second articulated arm means pivotally mounted to the gantry in spaced relation from the center of the bay, said arm means being linked together for mutual, transverse movement in the same direction and each arm means having a pulley assembly at the lower end engageable by an associated cable means, said arm means being movable in response to a transverse force applied to one of said pulley assemblies.

An object of this invention is to provide an auxiliary pulley means mounted to one of said first arm means and said gantry means in spaced relation from the center of rotation of the pulley means of said arm means, said auxiliary pulley means being engageable by said first cable means to determine the magnitude and direction of the transverse moving force applied to said arm means.

Yet another object is to provide a steering drum having the intermediate portion of the first cable means wound thereabout to apply the pull to the first cable means.

It is an object of the invention to provide a cable control system which is relatively inexpensive to manufacture and install, and which can easily be manually operated with maximum efficiency without special operator training.

BRIEF DESCRIPTION OF THE DRAWINGS:

FIG. 1 is a front elevational view of the vehicle wash gantry;

FIG. 2 is a plan view of the gantry;

FIG. 3 is a cross sectional view taken on line 3—3 of FIG. 1;

FIG. 4 is a schematic view illustrating the movement of the side brushes;

FIG. 5 is an enlarged, partly schematic view of the compensating assembly illustrating the inboard and outboard brush side positions;

FIG. 6 is a similar view illustrating the disposition of the compensating assembly parts when the side brushes engage the vehicle in an off-center position;

FIG. 7 is a cross sectional view taken on line 7—7 of FIG. 5;

FIG. 8 is a cross sectional view taken on line 8—8 of FIG. 5.

DESCRIPTION OF THE PREFERRED EMBODIMENT

Referring now by characters of reference to the drawings and first to FIG. 1 it will be understood that the vehicle wash apparatus disclosed provides a gantry 10, which is longitudinally movable relative to a vehicle 11. The gantry 10 includes side brush assemblies 12 and 13 which are used in conjunction with an overhead brush assembly (not shown) to clean the vehicle 11. The side brush assemblies 12 and 13 are moved back and forth manually by means of a cable and pulley control assembly generally indicated by numeral 20. The control assembly 20 includes a built-in compensating mechanism which provides a means of ensuring that the brushes 12 and 13 both engage the sides of the vehicle 11 with equal pressure to facilitate efficient washing even in those instances when the vehicle is not centrally aligned with the gantry 10.

The gantry 10 includes a box-like bridge member 14, having end spacer members 15, by which side post members 16 and 17 are connected to said bridge member 14. The post members 16 and 17 are provided with wheels 18 which are guided as by associated shoulders 19 to ensure that the gantry 10 remains in longitudinal alignment as it transverses the wash bay. The vehicle 11 is driven into the wash bay and remains stationary during the wash cycle. The side brush control assembly 20 permits the brushes to "float" so that there is no necessity to provide ground guides to accurately control the position of the vehicle 11. This control system 20 will now be described with particular reference to FIGS. 5–8.

The gantry bridge member 14 includes side plates 21 and an upper plate 22. Opposed channels 23 are attached, as by welding, to said side plates and provide tracks for a pair of carriages 24 and 25, which constitute first and second movable means respectively. Each carriage includes four wheel assemblies having horizontal and vertical components, 27 and 28 respectively, rollingly engaging said channels 23.

The side brush assemblies 12 and 13, which constitute first and second brush means respectively, are attached in depending relation to associated carriages 24 and 25 and are rotated by means of a drive assembly (not shown) mounted on each of said carriages. The carriages 24 and 25, and therefore the brush assemblies 12 and 13, are pulled back and forth along channels 23 by means of the cable and pulley brush control assembly, generally indicated by numeral 20.

Importantly, the control assembly 20 provides a compensating mechanism 29 which includes a pair of spaced, depending arms 30 and 31 which constitute first and second support means, and a rigid compensator bar 32, which is connected to each of said arms 30 and 31 by means of pivot connections 33 and 34 respectively and constitutes a link means tying said arms together for mutual movement in the same direction. Arm 30 is pivotally mounted to the bridge member 14 by means of pivot bolt connection 35 which extends through a bracket 36 and provides a first pivot point. The bracket 36 is attached, as by welding, to the bridge upper plate 22 and provides a base means for said arm 30. At its lower end the arm 30 includes a double pulley 37, which constitutes a pulley means and is pivotally mounted to the arm by means of fastener 38. In the proximity of the upper end of the arm 30 a double pulley assembly 40, which constitutes an auxiliary pulley means, is attached to the bracket 36 by means of a U-bolt connection 41, which permits said pulley assembly 40 to swivel to some extent. Arm 31 is pivotally mounted to the bridge member 14 by means of a pivot bolt connection 42 which extends through a bracket 43 and provides a second pivot point. The bracket 43 is attached, as by welding, to the bridge upper plate 22 and provides a base means for said arm 31. At its lower end the arm 31 includes a pulley assembly 44 which constitutes a pulley means and is attached to said arm by means of a U-bolt connection 45.

In the preferred embodiment the carriages 24 and 25 are moved by means of cables 46 and 47, each of which is attached to each of said carriages. Importantly, the carriages 24 and 25 from which side brushes 12 and 13 respectively depend, are moved back and forth by means of cables 46 and 47 each of which is attached to each of the carriages 24 and 25 as follows:

Carriage 24 incudes opposed end plates 50 and 51 and carriage 25 includes end plates 52 and 53. Cable 46, which constitutes a first cable means, is attached at one end by means of a loop 54 to carriage end plate 51 and at the other end, by means of a spring 55 and an eyebolt 56 to carriage end plate 53. In like manner, cable 47, which constitutes a second cable means is attached at one end by means of a loop 57 to carriage end plate 52 and by a spring 60 and an eyebolt 61 to carriage end plate 50. Cable 46 includes first and second portions 62 and 63 which pass around the double pulley 37; the auxiliary double pulley 40 and a third double pulley 65, which is attached to the gantry post 16 as by U-bolt 66. In the preferred embodiment, the cable 46 includes a portion, indicated by numeral 64, which is wound around a steering drum 67 and is integrally formed with the first and second portions 62 and 63. The drum is turned by a wheel 68 (FIG. 3) and a platform 70 is provided for the operator together with a shield 71 to protect him from spray. Cable 47 also includes first and second portions 72 and 73 and a portion 74 which passes about the single pulley 44 at the end of the arm 30, and is integrally formed with said first and second portions 72 and 73. It will be understood that the lengths of the various cable portions are not constant but change during the operation.

The compensating mechanism 29 responds to an imbalance of force which occurs when one carriage is prevented from moving freely. However, for a complete understanding of the apparatus, the cable control system will first be described with reference to FIG. 5, with the automobile 11 centered in the bay and without consideration of the compensating mechanism 29.

The carriages 24 and 25 are moved from the inboard position, shown in full lines in FIG. 5, to the outboard position, shown in phantom outline, by applying a pull to the first portion 62 of the cable 46. This pull is effectuated by rotating the cable drum 67 in a counterclockwise direction and is applied to the carriage 24 at the loop connection 54 at the end of said first portion 62 to move said carriage to the left. The movement of carriage 24 to the left causes a pull to be transmitted to the second cable 47, by virtue of the connection to carriage 24 provided by the spring and eye bolt assembly 60 and 61 at the end of the first cable portion 72, and to the carriage 25, by virtue of the loop 57 at the end of the second cable portion 73, thereby moving said carriage to the right.

When it is desired to move the carriages from the outboard to the inboard position a pull is applied to the second portion 63 of the first cable 46. This pull is effectuated by rotating the drum 67 in a clockwise direction and is applied to carriage 25 by virtue of the connection provided by the spring and eyebolt assembly 55 and 56 at the end of said second portion 63 to move said carriage to the left. The movement of carriage 25 to the left causes a pull to be transmitted to the second cable 47, by virtue of the loop connection 57 at the end of the first portion 72, and to carriage 24, by virtue of the spring and eyebolt assembly 60 and 61 at the end of the second portion 73, thereby moving said carriage to the right. The carriages 24 and 25 move together, although in opposite directions. As described above the carriages 24 and 25 move equal distances toward and away from the center of the gantry bay indicated by numeral 82. Thus, a vehicle 11 having a coincident center indicated by numeral 83 will have its sides, 80 and 81 engaged at the same time when the brushes 12 and 13 move in from the center limits indicated in phantom outline. However, unless compensating mechanism is provided, this is not the case when the vehicle center, as indicated by numeral 83' in FIG. 6, is offset from the center of the bay 82. The action of the compensating mechanism will now be described.

Importantly, the compensating mechanism 29 provides that if the side brush depending from one carriage meets an obstruction before the side brush depending from the other carriage, said other carriage can continue to move. Such an obstacle is provided by the side of a vehicle which is not centered in the bay and the action of the assembly will be described with reference to FIG. 6 in conjunction with FIG. 5.

In FIG. 5, the side limits of vehicle 11 aligned with the centerline of the wash are indicated by numerals 80 and 81. In FIG. 6 the side limits of the same vehicle, which is offset to the right as indicated by numeral 83', are indicated by numerals 80' and 81'. Assuming that the brushes 12 and 13 are initially at the outer limits shown in phantom outline in FIG. 6, it will be understood that clockwise rotation of the steering drum 67 will move the brushes 12 and 13 inwardly toward the center of the bay. The brushes will move together initially but the brush 13 will engage the side 81' before side brush 12 engages the side 80'. When brush 13 engages side 81' continued clockwise rotation of the drum 67 causes a pull to be exerted on the second portion 63 of the cable 46. Because of the angular relationship of this cable portion 63 relative to the pulley 37 at the bottom of the arm 30, an out-of-balance force is applied by said cable portion which causes the arm 30 and, by virtue of the compensator bar 32 the arm 31 also, to move to the right to the positions shown in FIG. 6. This movement results in the lengthening of cable portion 72 and the consequent shortening of cable portion 73 which moves carriage 24 to the right. This movement will continue until the brush 12 engages the vehicle side 81' precluding further movement.

It will be understood that in the situation in which the vehicle 11 is offset to the left instead of the right the brush 12 will engage the vehicle side 80' before the engagement of the other side 81' by brush 13. When brush 12 engages the vehicle side 80' continued clockwise rotation of drum 67 causes a pull to be exerted on the cable 46 which, through the medium of the carriage 24 is applied to both cable portions 72 and 73 which causes an out-of-balance force to be applied to the pulley 44 at the bottom of the arm 31. This force causes the arm 31 and, by virtue of the compensator bar 32 the arm 30 also, to move to the left which results in the shortening of cable portion 73 and the consequent lengthening of cable portion 72, with the result that the carriage 25 moves to the left.

I claim as my invention:

1. In a vehicle wash brush control system:
   a. base means including spaced pivot points,
   b. a first movable means movably mounted to the base means and carrying a first depending brush means,
   c. a second movable means movably mounted to the base means and carrying a second depending brush means,
   d. compensating means including:
      1. a first support means pivotally mounted to the base means at one of said pivot points and including an engagement portion spaced from said pivot point,
      2. a second support means pivotally mounted to the base means at the other of said pivot points and including an engagement portion spaced from said pivot point, and
      3. interconnecting means operatively connecting said first and second support means together for mutual transverse movement in the same general direction,
   e. first cable means including a first end portion connected to one of said movable means, a second end portion connected to the other of said movable means, and an intermediate portion operatively connecting said end portions, said intermediate portion being bearingly engageable with the engagement portion of one of said support means,
   f. second cable means including a first end portion connected to one of said movable means, a second end portion connected to the other of said movable means, and an intermediate portion operatively connecting said end portions, said intermediate portion being bearingly engageable with the engagement portion of the other of said support means, and
   g. pull means operatively connected to one of said first and second cable means to apply a pull thereto tending to urge said movable means in opposite directions,
   h. said pull means tending to apply a force to the engagement portion of one of said support means through the engaging intermediate portion of the associated cable means sufficient to move said one support means and one of said movable means in one direction when the other of said movable means is prevented from moving in the other direction.

2. A brush control system as defined in claim 1, in which:
   i. each of said support means includes a depending arm means, and
   j. the interconnecting means includes a rigid elongate member pivotally connected between said arm means.

3. A brush control system as defined in claim 1, in which:
   i. said first support means includes an arm means having pulley means mounted in spaced relation from the base pivot point and providing said engagement portion, and
   j. said first cable means is engageable in bearing relation with said pulley means to apply said moving force to said arm means.

4. A brush control system as defined in claim 3, in which:
   k. an auxiliary pulley means is mounted to one of said support and base means in spaced relation from the center of rotation of said pulley means, and said auxiliary pulley means includes an engagement portion engageable by said first cable means in bearing relation to determine the magnitude and direction of the moving force applied to said support means.

5. A brush control system as defined in claim 1, in which:
   i. said first support means includes a depending arm means having pulley means mounted in spaced relation from its base pivot point and providing said engagement portion,
   j. said second support means includes a depending arm means having pulley means mounted in spaced relation from its base pivot point,
   k. said interconnecting means includes an elongate rigid member connected to said first and second arm means at a point intermediate the pivot point and pulley means of each arm,
   l. said first cable means is engageable with the engagement portion of the pulley means of said first arm means to apply said moving force to said arm means, and
   m. said second cable means is disposed about the pulley means of said second arm means.

6. A brush control system as defined in claim 1, in which:
   i. said pull means includes a steering drum rotatively mounted to said base means and having rotating means, and
   j. said intermediate portion connecting the first and second end portions of the first cable means includes an integral cable portion wound about said steering drum.

7. In a vehicle wash brush control system:
a. gantry means including first and second spaced pivot points and a horizontal track,
b. a first carriage means movably mounted to the track and carrying a first depending brush means,
c. a second carriage means movably mounted to the track and carrying a second depending brush means,
d. compensating means including:
  1. a first depending arm means pivotally mounted to the gantry means at said first pivot point and having pulley means disposed in spaced relation from said pivot point,
  2. a second depending arm means pivotally mounted to the gantry means at said second pivot point and having pulley means disposed in spaced relation from said pivot point, and
  3. rigid link means pivotally connected at its ends to each of said arm means to cause both of said depending arm means to move transversely in the same general direction,
e. first cable means including opposed end portions and an intermediate portion, one of said end portions being connected to said first carriage means and the other of said end portions being connected to said second carriage means and said intermediate portion being bearingly engageable with the pulley means of said first arm means,
f. second cable means including opposed end portions and an intermediate portion, one of said end portions being connected to said first carriage means and the other of said ends being connected to said second carriage means and said intermediate portion being disposed about said pulley means of said second arm means, and
g. pull means operatively connected to one of said first and second cable means to apply a pull thereto tending to urge said carriages in opposite directions,
h. said pull means including a rotating member receiving the intermediate portion of said first cable means thereabout to apply a force to said first arm means through said cable means sufficient to move said first and second arm means and said first carriage means in one direction when said second carriage means is prevented from moving in the other direction.

8. A brush control system as defined in claim 7, in which:
i. an auxiliary pulley means, mounted to one of said first arm means and gantry means, is disposed above the pulley means of the first arm means in spaced relation from the center of rotation of said pulley means and said auxiliary pulley means is engageable by said first cable means to determine the magnitude and location of the moving force applied to said pulley means of said first arm means.

9. A brush control system as defined by claim 8, in which:
j. the intermediate portion of the first cable means includes first and second portions disposed in side-by-side relation and both of said first and second portions are bearingly engageable with the pulley means of said first arm means and said auxiliary pulley means.

10. In a vehicle brush wash control system:
a. base means longitudinally movable relative to the vehicle,
b. first movable means mounted to the base means for transverse movement relative to the vehicle and carrying a first depending brush means engageable with one side of the vehicle,
c. second movable means mounted to the base means for transverse movement relative to the vehicle and carrying a second depending brush means engageable with the other side of the vehicle,
d. cable means connected to said first and second movable means,
e. pull means operatively connected to said cable means to apply a pull selectively to said cable means to move said movable means in opposite directions away from each other or toward each other,
f. compensating means interconnected with said cable means and transversely movable to permit the brush means carried by one of said movable means to move into cleaning engagement with one side of an off-centered vehicle when the brush means carried by the other of said movable means is cleaningly engaged with the other side of said off-centered vehicle.

* * * * *